No. 847,609. PATENTED MAR. 19, 1907.
G. L. ROUX.
RAZOR.
APPLICATION FILED SEPT. 10, 1906.

WITNESSES:

George L. Roux,
INVENTOR.
By C. A. Snow & Co.
ATTORNEYS

UNITED STATES PATENT OFFICE.

GEORGE L. ROUX, OF FERNANDINA, FLORIDA.

RAZOR.

No. 847,609.

Specification of Letters Patent.

Patented March 19, 1907.

Application filed September 10, 1906. Serial No. 334,033.

*To all whom it may concern:*

Be it known that I, GEORGE L. ROUX, a citizen of the United States, residing at Fernandina, in the county of Nassau and State of Florida, have invented a new and useful Razor, of which the following is a specification.

This invention relates to razors; and its object is to provide a device of this character utilizing a rotary blade adapted to be operated by any suitable power.

Another object is to provide a combined guard and casing for the blade which is of novel construction and arrangement.

With the above and other objects in view the invention consists of certain novel features of construction and combinations of parts which will be hereinafter more fully described, and pointed out in the claims.

In the accompanying drawings is shown the preferred form of the invention.

Figure 3:
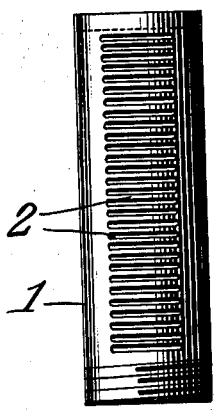
Figure 1:
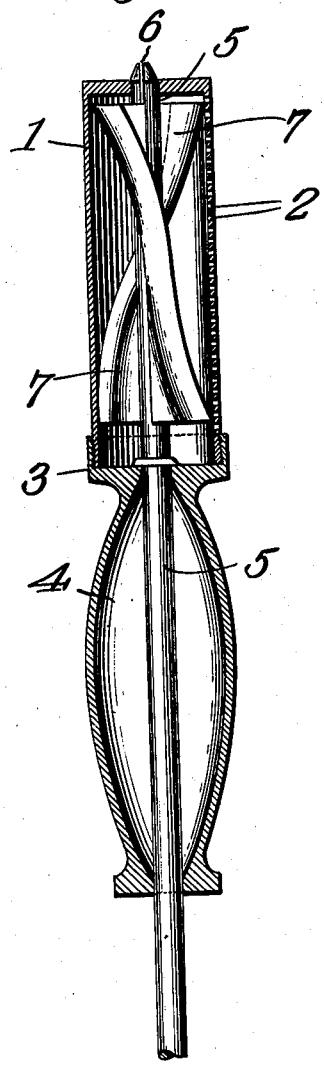
Figure 2:
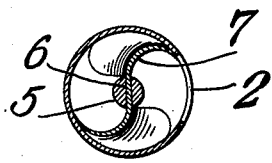

In said drawings, Figure 1 is a longitudinal section through the razor. Fig. 2 is a transverse section therethrough, and Fig. 3 is an elevation of the outer casing or guard.

Referring to the figures by characters of reference, 1 is a cylindrical casing, preferably formed of a very thin sheet of metal and having a plurality of parallel slots 2 formed therein at points close together and extending partly around the casing. The ends of the casing may be closed in any desired manner, and one end thereof is adapted to be screwed into the enlarged end 3 of a hollow handle 4. A shaft 5 is rotatably mounted within the handle and casing, and that portion thereof within the casing has a longitudinal slot 6, adapted to receive a blade 7 of peculiar contour. This blade has its opposite portions curved in opposite directions, as shown particularly in Fig. 2, and is twisted so as to produce substantially spiral edges which are sharpened. The entire blade is formed, preferably, in a single piece of spring metal, which when inserted longitudinally into the slot 6 and casing 1 presses outward against the inner face of the casing.

The shaft 5 may be rotated by means of a suitable motor, or mechanism may be provided whereby the same may be operated by hand. The rotating shaft will carry the blade 7 therewith, and the cutting edges of the blade will travel over the inner face of the casing. By placing the slotted portion of the casing upon that portion of the face to be shaved the beard will project through the slots and into the casing, and the revolving blade will remove it quickly and effectually. The blade produces a shearing action because of the spiral arrangement of its cutting edges, and as the casing is formed of very thin material it will be seen that a very close shave can be had by using this razor, it merely being necessary to press the slotted portion of the casing firmly against the part to be shaved.

The preferred form of the invention has been set forth in the foregoing description; but I do not limit myself thereto, as I am aware that modifications may be made therein without departing from the spirit or sacrificing the advantages thereof, and I therefore reserve the right to make such changes as fairly fall within the scope of the claims.

What is claimed is—

1. A razor comprising a casing and a cutting-blade rotatably mounted with and bearing upon the inner surface of the casing, said blade having a spiral edge, said casing being provided with a plurality of parallel slots extending in the direction of movement of the blade.

2. A razor comprising a casing having openings therein, and a spring-blade rotatably mounted within and bearing upon the inner face of the casing, said blade having spiral cutting edges.

3. A razor comprising a casing having openings therein, a spring-blade detachably mounted and rotatable within the casing, the edges of said blade being spiral and bearing upon the inner face of the casing.

4. A razor comprising a casing having openings therein, a slotted shaft rotatably mounted within the casing, and a spring-blade detachably mounted within the slot and rotatable with the shaft, said blade bearing upon the inner face of the casing.

5. In a razor the combination with a casing having openings therein; of a handle detachably connected to and adapted to close one end of the casing, a shaft rotatably mounted within the handle and casing, said shaft having a longitudinal slot therein, and a transversely-curved spring-blade detachably mounted within the slot and exerting a constant pressure upon the inner surface of the casing.

6. In a razor the combination with a casing having openings therein; of a handle detachably connected to and adapted to close one end of the casing, a shaft rotatably mounted within the handle and casing, said shaft having a longitudinal slot therein, and a transversely-curved spring-blade detachably mounted within the slot and exerting a constant pressure upon the inner surface of the casing, the cutting edges of said blade being spiral.

In testimony that I claim the foregoing as my own I have hereto affixed my signature in the presence of two witnesses.

GEORGE L. ROUX.

Witnesses:
E. HUME TALBERT,
HERBERT D. LAWSON.